United States Patent
Pilcher et al.

(10) Patent No.: US 7,157,816 B2
(45) Date of Patent: Jan. 2, 2007

(54) MOTOR PROVIDING OSCILLATING ACTION FOR A PERSONAL CARE APPLIANCE

(75) Inventors: Kenneth A. Pilcher, Seattle, WA (US); David Giuliani, Mercer Island, WA (US); Stephen M. Meginniss, III, Seattle, WA (US); Richard A. Reishus, Renton, WA (US); Dane M. Roth, Seattle, WA (US)

(73) Assignee: Pacific Bioscience Laboratories, Inc., Bellevue, WA (US)

( * ) Notice: Subject to any disclaimer, the term of this patent is extended or adjusted under 35 U.S.C. 154(b) by 0 days.

(21) Appl. No.: 10/873,564

(22) Filed: Jun. 22, 2004

(65) Prior Publication Data

US 2005/0280319 A1 Dec. 22, 2005

(51) Int. Cl.
*H02K 33/00* (2006.01)
(52) U.S. Cl. .......................................... 310/36; 310/38
(58) Field of Classification Search ................. 310/36, 310/38; 335/69; 318/119–134
See application file for complete search history.

(56) References Cited

U.S. PATENT DOCUMENTS

| 3,192,488 | A  | * | 6/1965  | Faith et al. | 331/154 |
| 6,833,639 | B1 | * | 12/2004 | Lau et al.   | 310/36  |
| 6,845,537 | B1 | * | 1/2005  | Wong         | 15/22.1 |
| 2004/0119344 | A1 | * | 6/2004 | Lau et al.   | 310/36  |

* cited by examiner

*Primary Examiner*—Burton S. Mullins
*Assistant Examiner*—David W. Scheuermann
(74) *Attorney, Agent, or Firm*—Jensen & Puntigam P.S.

(57) ABSTRACT

The motor assembly which produces an oscillating action for a personal care device includes a horizontally positioned U-shaped stator portion, and an armature portion which includes a torsion spring shaft which is anchored at one end thereof. The armature portion also includes a U-shaped magnet mounting member which is fixed near the upper end of the spring shaft, the U-shaped member including two opposing legs which extend along a substantial part of the length of the spring shaft, away therefrom. At the tips of each leg are magnet assemblies, which interact with the stator portion in alternating torsion, to produce a back-and-forth oscillation of the armature and a brushhead or other workpiece attached thereto.

9 Claims, 1 Drawing Sheet

MOTOR PROVIDING OSCILLATING ACTION FOR A PERSONAL CARE APPLIANCE

TECHNICAL FIELD

This invention relates generally to personal care appliances, including those used for clinical applications, and more specifically concerns a motor structure suitable for use in such appliances.

BACKGROUND OF THE INVENTION

A motor for use in a small appliance which has an oscillating action will typically include a restoring mechanism, such as a spring of some kind, which in operation provides a selected amount of torque, depending upon the particular application. The design requirements for the oscillating action are determined by the system spring rate required to provide the desired mechanical resonant frequency of the spring mass assembly. The electrical and mechanical operating frequencies, which includes the resonant frequency of the spring mass system, must be balanced in order to optimize performance of the appliance. In many applications, a low profile (low height) of the appliance is important for the user's convenience, which places significant limitations on the overall configuration of the spring mass system.

Various motor structures for small appliances are known, with each system having particular advantages and disadvantages, depending on the application requirements. A torsion tube spring has been used to provide the restoration function of an oscillating motor, but torsion tubes are not readily available in the highest strength spring material and therefore often require a longer length than is feasible for the present embodiment. Clamping the ends of torsion tubes, without collapsing the tubes, presents another significant challenge for a torsion tube embodiment. Non-axial torsion wire arrangements can be used, but such an arrangement results in high stress on the individual wires, as well as excessive Z-axis movement. Another possible approach uses pairs of ribbon or leaf springs, but such an arrangement has a high cost and produces excessive stresses on the spring members. Also, many of these approaches are often too complex for extended reliable operation.

Hence, in a personal care appliance, such as a skin care appliance, which uses an oscillating workpiece, a motor arrangement is desirable which is low profile, reliable in operation, and able to withstand the stresses inherent in oscillating action.

SUMMARY OF THE INVENTION

Accordingly, the invention is a motor for providing periodic oscillating action for a personal care appliance, comprising: a stator portion; an armature portion which includes a central torsion spring shaft fixed at one end thereof, a magnet mounting member which is affixed to the spring shaft in the vicinity of the other end thereof, the magnet mounting member including two opposing mounting portions extending along a substantial portion of the length of the spring shaft and spaced apart therefrom, and magnet assemblies located near the ends of the two mounting portions, aligned for operative motor interaction with the stator portion; and a driving assembly for driving the motor such that the armature oscillates through an angle within the range of 8–26°.

BEST MODE FOR CARRYING OUT THE INVENTION

Figure 1:
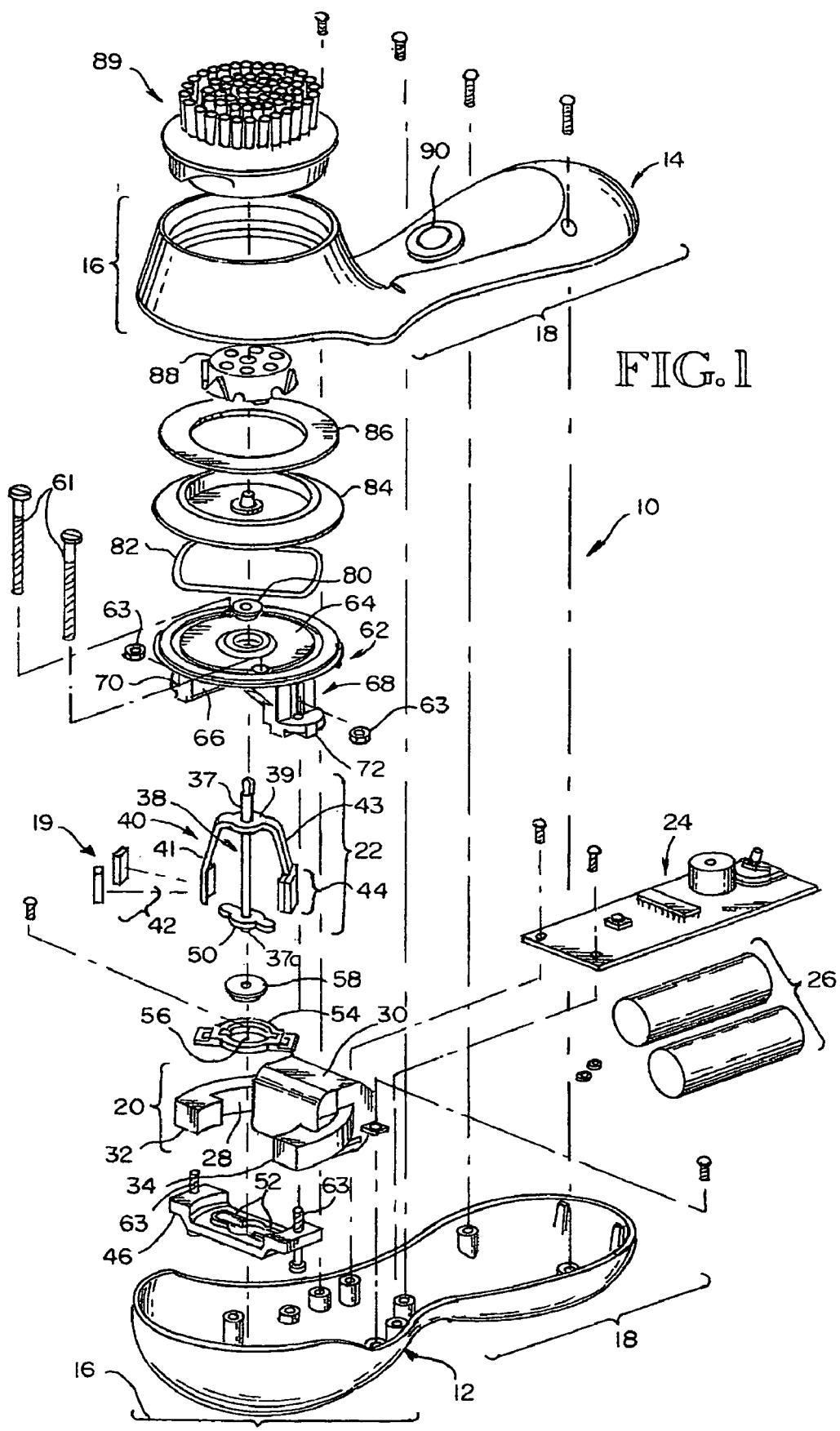
FIG. 1 is an exploded view of a personal care appliance which includes the motor structure of the present invention.

FIG. 1 shows a personal care appliance which is particularly adapted for a facial skin cleaning application and which includes an embodiment of the motor structure of the present invention. It should be understood, however, that the motor can be used in other personal care appliances, including, for example, those adapted for acne and blackhead treatment; athlete's foot treatment; wound cleansing treatment and treatment of slow/non-healing wounds; scalp cleansing; chemical peel procedures; calloused skin and psoriasis treatment; and various shaving applications, including treatment of razor bumps and for use in a shaving cream applicator.

In the embodiment shown, the appliance shown generally at 10 includes an appliance cover base portion 12 and a mating cover top portion 14. Both the base and top portions are molded parts, in plastic. The appliance includes a head portion 16 and a handle portion 18 which are ergonomically shaped to be easily grasped by a user and conveniently used.

Motor 19 includes a stator portion 20 and an armature assembly portion 22. The motor is driven by a drive circuit, shown generally at 24, powered by replaceable or rechargeable batteries 26. Stator 20 is oriented horizontally, with a horizontal lamination stack 28; on the lamination stack is mounted a winding 30. In the embodiment shown, lamination stack 28 is basically U-shaped, comprising 26 laminations, with two end portions 32 and 34.

Armature 22 includes a high strength torsion wire spring 38. In the embodiment shown, wire spring 38 acts as the return spring for the motor 19. In the embodiment shown, wire spring 38 is 0.07 inches in diameter over most of the length thereof, with end portions (upper and lower) 37–37a being 0.125 inches in diameter. The larger diameter end portions permit the spring to be conveniently and reliably clamped. In the embodiment shown, wire spring 38 is manufactured by starting with a larger diameter wire (0.125 inches in diameter) and "necking down" the center portion to the desired 0.07 inch diameter. In the embodiment shown, the wire spring is heat treated music wire or similar wire. Stainless steel, carbon steel or titanium all can be used. The wire spring has a length of approximately 1.02 inches, only as long as required to withstand the operational stresses of the structure.

The armature assembly 22 includes a U-shaped magnet mounting bracket 40, wire spring 38, an anchor member and two pairs of magnets. The U-shaped magnet mounting bracket 40 is mounted to the wire spring 38 at an upper end portion 37. In the embodiment shown, mounting bracket 40 is made from steel, is approximately 0.074 inches thick by 0.200 inches wide and has a total length of 3.0 inches. The mounting bracket includes a center portion 39 and two opposing leg portions 41 and 43, the leg portions being separated from the wire spring 38 by a distance of approximately 0.46 inches. At the tips of each leg portion is a pair of magnets. The two pairs of magnets 42 and 44 are bonded to the ends of the leg portions and are canted relative to each other so that each magnet face is oriented perpendicularly radially with respect to the wire spring axis for optimum alignment with the end portions of the stator lamination stack.

The armature assembly magnets move radially in the plane of the stator, oscillating inside opposing end portions 32 and 34 of the lamination stack. This arrangement enables the proper location of the magnets between the end portions of the lamination stack, while allowing the center portion of the armature to be mounted some distance from the plane of the horizontal lamination stack, permitting a long spring length. This also allows the lamination stack to be mounted horizontally near the wide portion of the appliance. This arrangement results in an efficient use of vertical space in the appliance, providing the desired low profile, while reducing stress on the spring.

The lamination stack 28 is secured directly to a motor mount plate 46, which in turn is mounted to the cover base portion 12 of the appliance, and is also secured to a motor shaft bracket 62, discussed below. Motor mount plate 46 is generally rectangular in configuration and includes a center portion 48 which is configured to receive anchor member 50 of the armature assembly, which is affixed to a lower end portion 37a of wire spring 38. The anchor 50 is configured as shown to fit within and to be held by lateral retention elements 52 on the central portion 48 of the motor mount plate 46. This arrangement secures the lower end 37a of wire spring 38 against twisting. Located at the inboard side of anchor 50 is a lower bearing bracket 54 which has a length to fit over the protruding tips of the mounting bracket 40. Bearing bracket 54 has a central opening 56 therein in which is mounted a split bearing 58. Split bearing 58 is designed to clamp over the smaller diameter portion of the wire spring 38 and maintain the radial alignment of the tips (with the magnets) of the mounting bracket 40 with the stator, for proper armature motion.

Hence, mounted in succession in the embodiment shown is motor mount plate 46, anchor element 50 and bearing bracket 54 with split bearing 58. The armature remains symmetrical about the axis of rotation, centering the armature near the base of the wire spring 38.

The upper end portion 37 of wire spring 38 extends to a motor shaft alignment bracket 62. Motor shaft bracket 62 includes a circular plate 64 and two opposing leg portions 66 and 68 which extend downwardly from the circular plate 64. The legs 66, 68 include horizontal end sections 70 and 72, which include openings therethrough, through which screws 61-61 are directed to secure bracket 62 to the cover base portion 12, to increase the overall stability of the bracket and the armature assembly. In the center of motor shaft bracket 62 is an opening in which is positioned an upper bearing member 80, through which the upper end 37 of torsion wire spring 38 extends. Upper bearing 80 ensures that the free end of the wire spring 38 (and hence magnets 42, 44) oscillates uniformly about the desired axis.

Motor shaft bracket 62, laminated stack 28 and the motor mount plate 46 are mounted securely together by screw/nut combinations 63—63, with bracket 62 being mounted to the cover base portion by screws 61. The rotation of wire spring 38 is maintained concentric with the mating parts by the bearings 58 and 80.

In order for the motor to function properly, the center (longitudinal) axis of the magnet mounting bracket 40 must be properly positioned with respect to the long axis of anchor 50. An offset angle of approximately 35° provides the required initial position for the motor to draw the magnets 42, 44 toward alignment with the end portions 32, 34 of the lamination stack.

In operation, motor 10 is driven through an angle within the range of 4–13° (total rotation of spring is 8°–26°) by applying an alternating bipolar square wave signal to winding 30 of the stator by the drive assembly (electronics) 24. The first half of the signal is applied, resulting in the magnet pairs 42, 44 being moved toward alignment with the end portions 32, 34 of the lamination stack, the rotation of the magnet mounting bracket 40 and the twisting of wire spring 38 about its fixed end 50, producing a rotation of the upper end 37 thereof. The drive signal is then turned off, with the armature assembly being returned to its original position by action of wire spring 38. The other half of the alternating drive signal is then applied to winding 30, moving the armature assembly in the other direction. The frequency of the oscillating action is within the range of 120–220 Hz, with a preferred frequency of approximately 160 Hz, and the total range of motion is 8°–26°, with a preferred value of 10°.

In the upper surface of circular plate 64 of mounting bracket 62 is a groove in which is positioned a wave washer spring 82. Next is a circular motor shaft seal 84, which matches the configuration of circular plate 64, with an open center, through which the top end 39 of wire spring 38 extends. Seal 84 is typically made from a low durometer material. The dynamic portion of the seal is slightly larger in diameter than the upper end portion 37 of wire spring 38. It is generally conical, approximately 0.010 inches thick, and is designed to buckle, rather than stretch, in use. Positioned against the upper surface of seal 84 is an annular sealing ring 86, which reduces the sliding friction on a brush assembly portion of the appliance during installation. In the embodiment shown, ring 86 is made typically from a material with a relatively low coefficient of friction.

Mounted on the upper end 37 of torsion wire spring 38 is a brush hub member 88 to which is mounted a brush assembly 89. The brush hub 88 and brush assembly 89 do not form a part of the present invention, which is directed toward the appliance motor configuration, but are illustrated as an example of a personal care appliance which can be driven effectively by the motor embodiment shown and described. Other brush assemblies or workpieces can certainly be utilized in the present invention.

In use, operation of the appliance is initiated by action of on/off switch 90, which results in a twisting motion of the armature assembly as described above, and in particular, an oscillation of the upper end thereof, on which is mounted a workpiece, such as the brush assembly 89 shown. The moving part of the brush assembly oscillates through a selected angle, depending upon the application. The motor assembly shown is relatively easy to manufacture, is cost-efficient, and while providing a relatively low profile for ease and convenience of use, also provides a rugged and dependable design.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A motor for providing periodic oscillating action for a personal care appliance, comprising:
   a stator portion;
   an armature portion which includes a central torsion spring shaft fixed at one end thereof, a magnet mounting member which is affixed to the spring shaft in the vicinity of the other end thereof, the magnet mounting member including two opposing mounting portions, approximately 180° apart, extending along a substantial portion of the length of opposing sides of the spring shaft and spaced apart therefrom, and magnet assemblies located near the ends of the two mounting portions, aligned for operative motor interaction with the stator portion; and a driving assembly for driving the motor such that the armature oscillates through an angle less than 30°.

2. The motor of claim 1, including bearing means for supporting the spring shaft for rotation about a longitudinal axis, the bearing means located near opposing ends thereof.

3. The motor of claim 1, wherein the stator portion is horizontally positioned, and includes a generally U-shaped lamination stack having end portions thereon, with which the magnets on the mounting portions of the magnet mounting member come into alignment and are alternately repulsed from and attracted to in operation of the motor.

4. The motor of claim 3, including a motor mount plate and an anchor member fixed to said one end of the spring shaft, the anchor member being received into a matching configured portion of the mounting plate, preventing rotational movement of the anchor member and hence said one end of the spring shaft as well.

5. The motor of claim 1, wherein each magnet assembly includes two side-by-side magnets, the magnets being canted such that each magnet face is oriented perpendicularly radially with respect to a longitudinal axis of the wire spring.

6. The motor of claim 4, including a lower bearing bracket and a lower bearing located therein, through which the torsion spring shaft extends.

7. The motor of claim 1, wherein the magnet mounting member is U-shaped, having a center portion connected fixedly to the spring shaft and wherein said mounting portions are two opposing leg members, the magnet assemblies located, respectively, near free end tips of the leg members.

8. The motor of claim 4, including an upper motor bracket having an opening therein through which the other end of the spring shaft extends, in a bearing located in the opening of the upper motor bracket, wherein the upper motor bracket, the lamination stack and the motor mount plate are fixedly connected together.

9. The motor of claim 8, wherein the upper motor bracket is connected to a cover portion of the appliance.

* * * * *